United States Patent
Billaud (10) Patent No.: US 10,598,779 B2
(45) Date of Patent: Mar. 24, 2020

(54) SECONDARY RADAR ABLE TO DETECT TARGETS AT HIGH ELEVATION

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 293 days.

(21) Appl. No.: 15/466,160

(22) Filed: Mar. 22, 2017

(65) Prior Publication Data
US 2017/0276782 A1    Sep. 28, 2017

(30) Foreign Application Priority Data

Mar. 25, 2016  (FR) ..................... 16 00504

(51) Int. Cl.
| | | |
|---|---|---|
| G01S 13/66 | (2006.01) | |
| G01S 13/78 | (2006.01) | |
| G01S 7/40 | (2006.01) | |
| G01S 13/76 | (2006.01) | |
| H01Q 25/02 | (2006.01) | |
| G01S 13/87 | (2006.01) | |
| H01Q 3/04 | (2006.01) | |

(52) U.S. Cl.
CPC ............ G01S 13/66 (2013.01); G01S 7/4026 (2013.01); G01S 13/762 (2013.01); G01S 13/781 (2013.01); H01Q 25/02 (2013.01); G01S 13/872 (2013.01); G01S 2007/4034 (2013.01); H01Q 3/04 (2013.01)

(58) Field of Classification Search
None
See application file for complete search history.

(56) References Cited

U.S. PATENT DOCUMENTS

| | | | | |
|---|---|---|---|---|
| 4,303,920 A | | 12/1981 | Mortimer | |
| 4,334,224 A | * | 6/1982 | Gordon ................. | G01S 13/762 342/149 |
| 4,918,610 A | * | 4/1990 | Becker ...................... | G01S 5/14 342/47 |
| 5,103,233 A | * | 4/1992 | Gallagher ............... | G01S 13/22 342/408 |
| 5,115,244 A | * | 5/1992 | Freedman ............... | G01S 13/22 342/137 |
| 5,196,856 A | * | 3/1993 | Litchford .................. | G01S 3/02 342/32 |
| 5,218,365 A | * | 6/1993 | Woodall ................ | G01S 13/762 342/32 |

(Continued)

FOREIGN PATENT DOCUMENTS

| | | |
|---|---|---|
| EP | 2 922 144 A1 | 9/2015 |
| EP | 2 930 531 A1 | 10/2015 |

*Primary Examiner* — Marcus E Windrich
(74) *Attorney, Agent, or Firm* — Baker & Hostetler LLP (57) ABSTRACT

A radar is equipped with a main antenna having three radiation patterns, sum, difference and control, corresponding to the antenna, the radar comprises an auxiliary antennal device, composed of an antenna and of a rear radiating element which is situated at the rear of the antenna, fixed above the antenna and coupling means, the auxiliary antennal device: having three radiation patterns, sum, difference and control, the control pattern ensured for the direction opposite to the antenna by the rear radiating element; the antenna inclined to guarantee a maximum gain of its sum pattern in the elevational domain (60°-90°).

7 Claims, 7 Drawing Sheets

Coverage of an ATC radar according to the invention (56) References Cited

U.S. PATENT DOCUMENTS

| | | | | |
|---|---|---|---|---|
| 5,311,187 A | * | 5/1994 | Garside | G01S 13/872 342/158 |
| 5,495,249 A | * | 2/1996 | Chazelle | G01S 7/032 342/146 |
| 5,619,206 A | * | 4/1997 | Cole, Jr. | G01S 13/4454 342/149 |
| 6,608,601 B1 | * | 8/2003 | Collinson | H01Q 1/12 342/59 |
| 6,771,205 B1 | * | 8/2004 | Barton | G01S 13/72 342/13 |
| 2011/0181455 A1 | * | 7/2011 | Vanuytven | G01S 7/2813 342/27 |
| 2012/0068878 A1 | * | 3/2012 | Billaud | G01S 7/034 342/37 |

* cited by examiner

SECONDARY RADAR ABLE TO DETECT TARGETS AT HIGH ELEVATION

CROSS-REFERENCE TO RELATED APPLICATIONS

This application claims priority to foreign French patent application No. FR 1600504, filed on Mar. 25, 2016, the disclosure of which is incorporated by reference in its entirety.

TECHNICAL FIELD

The present invention relates to a secondary radar able to detect targets at high elevation.

BACKGROUND

Air traffic control radars do not generally cover all the elevational angles lying between the direction of the horizon and the zenith. The non-covered zone above the radar antenna's phase center forms a cone that is called the silence cone. This silence cone can affect several air traffic control radar functions.

"En-route" radars are characterized by a very long range in the direction of their maximum radiation. Their installation at high-altitude sites, by freeing them from obstacles of the relief, guarantees their ability to exploit this low-elevation range capability. For these radars, the silence cone may be deemed too large (for example, the cruising altitude of commercial flights (FL 330) corresponds to an elevation angle of 25° at 25 km). The silence cone may also pose problems for an airport radar. Indeed, in both cases the silence cone induces gaps:

of long duration for flights at high altitude (En-route configuration);

of not such long duration but for medium altitude maneuvering flights (Airport configuration).

Conventionally, in principle the antennas of air traffic control radars, also called ATC radars, are therefore antennas of LVA (Large Vertical Aperture) type having four objectives:

a large maximum gain for "En-route" uses (long-range), typically 27 dB between 5° and 10° of elevation;

an azimuthal slender main beam (conventionally 2.5° corresponding to an antenna width of 8 m) to ensure precision and limit the effect of pollution.

a large drop to the ground to protect itself in airport configuration from the reflections of nearby buildings, such as towers of a few tens of meters, with for example a drop in gain of 2 dB per degree for elevations from 0° to −10°;

finally a transmitted or received level with the targets that is quasi-constant for long-haul flights (stable in altitude) conventionally of 5° to 40.

Figure 1A:
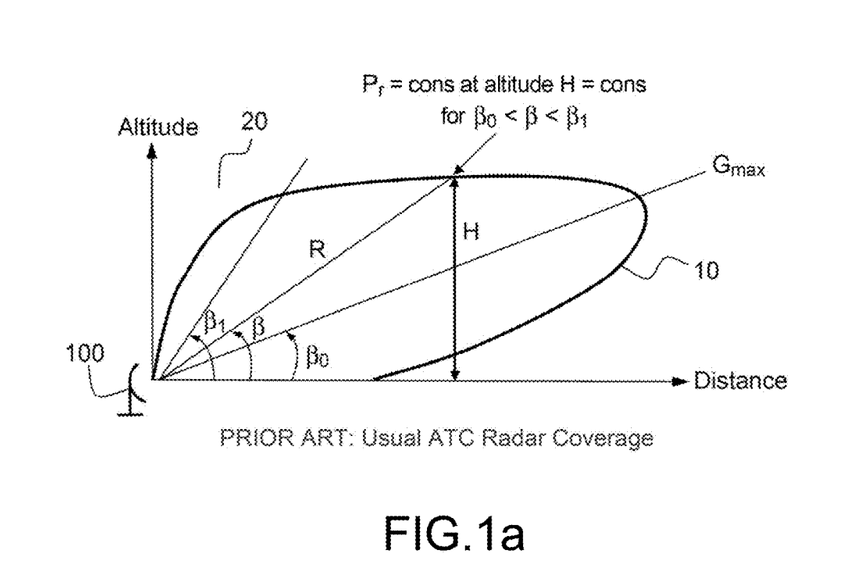
FIG. 1a, already described, an exemplary ATC radar coverage using basic gain pattern of a conventional ATC radar antenna according to the known prior art.

The antennas of the civil air traffic control (ATC) sector exhibit a cosecant squared radiation pattern, on account of their adaptation to aerial surveillance: such a pattern makes it possible to distribute in the vertical plane the energy radiated in a single exploration of the azimuthal quantum. This radiation pattern makes it possible to obtain a received signal of relatively constant amplitude for a target describing a constant-altitude trajectory. FIG. 1a illustrates the typical ATC Radar Coverage due to the gain of a conventional ATC antenna 100. More particularly, it illustrates by a curve 10 the antenna gain parametrized by angle of elevation and projected into a distance-altitude diagram.

For a cosecant squared pattern such as this and in a zone traversed according to a constant-altitude trajectory, the antenna gain G varies substantially as the square of the cosecant of the angle of elevation $\beta$, i.e. $G(\beta) \approx \text{cosec}2\beta$, that is to say that the variation of this gain compensates the closing-in effect so as to preserve a constant received signal level over this part of the trajectory. Moreover, it is not useful to perform surveillance of the airspace at an altitude greater than the aircraft flight ceiling.

In practice, the silence cone 20 is envisaged rather as a degree of freedom for the design of the antenna. In particular the requirements would pertain rather to a guaranteed fading beyond about 50° of elevation. FIG. 2c presents the elevational patterns for the sum pathway 21 and the control pathway 22 (each relative with respect to their respective maximum) of a conventional LVA antenna. This figure shows that the antenna gain plummets at high elevation (angles beyond 50°).

Figure 2A:
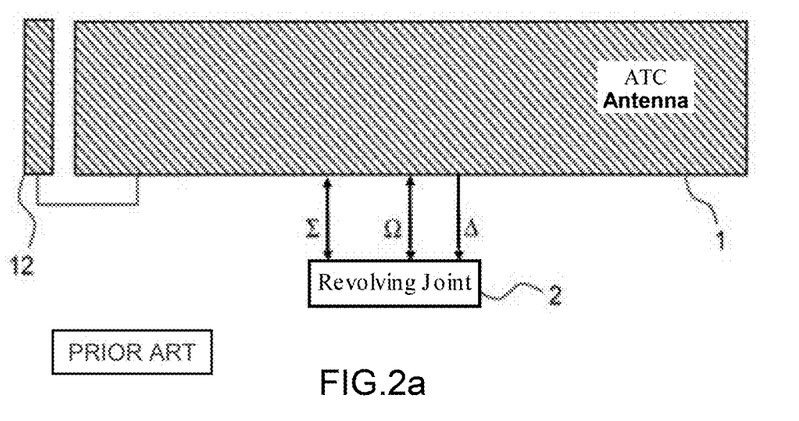
FIG. 2a, already described, the structure of a conventional antenna of an ATC radar according to the prior art.
Figure 2B:
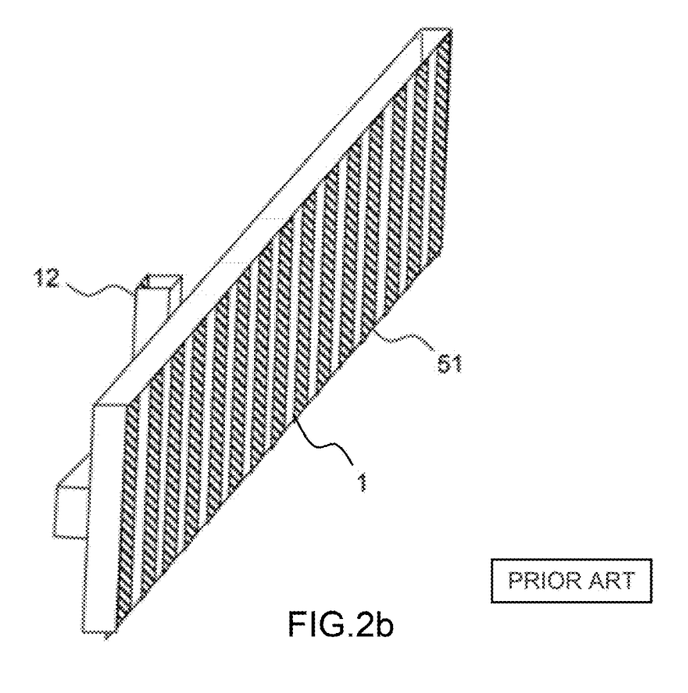
FIG. 2b, already described, an exemplary embodiment of a conventional ATC radar antenna.
Figure 2C:
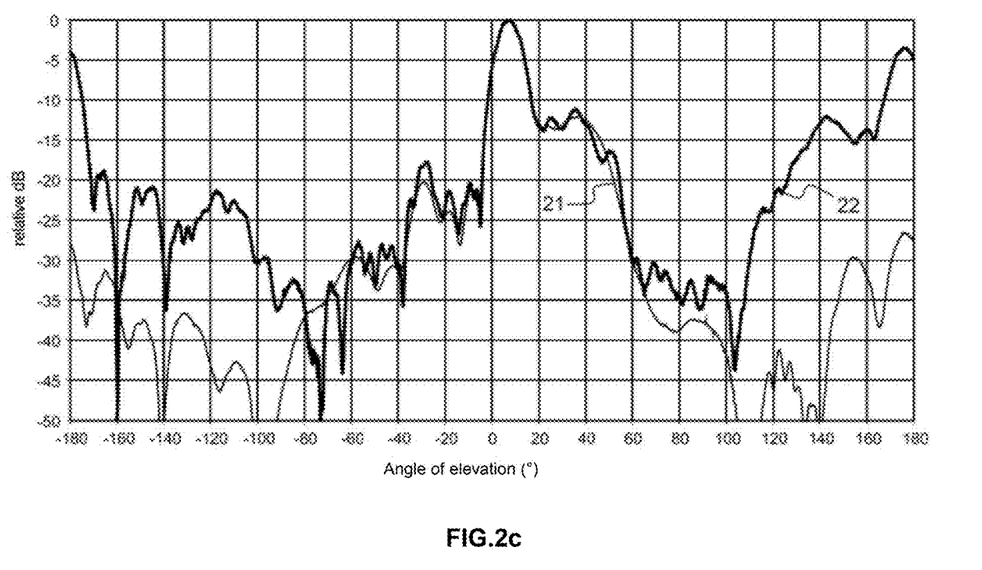
FIG. 2c, a typical pattern, already described, of relative radiation in elevation of a conventional LVA ATC antenna.

The current antennas used in the ATC world, such as antenna illustrated by FIGS. 2a and 2b, comprise an antenna front panel 1, oriented forwards, insuring the sum radiation pattern 21, the front radiation pattern assigned to the control function (control pattern or "cont" pattern 22) and the difference radiation pattern, as well as a rear radiating element 12 oriented backwards, ensuring the complementary back radiation pattern assigned to the control function (control pattern 22). The outputs of such an antenna corresponding to the SUM pattern, the difference pattern and the control pattern are delivered to a standard revolving joint 2 possessing three RF wafers for the three pathways corresponding to the three patterns: the sum pathway $\Sigma$, the difference pathway $\Delta$ and the control pathway $\Omega$. As shown in FIG. 2c, in particular, such antennas are therefore clearly not made to deal with targets in the silence cone.

Consequently, the system level solution for alleviating this state of affairs, which is common to ATC radars, consists in using dual radar coverage. These 2 radars being fairly close together make it possible to each ensure detection in the silence cone of the other.

SUMMARY

An aim of the invention is in particular to alleviate this drawback. For this purpose, the subject of the invention is a secondary radar able to detect a target at high elevation in the silence cone, equipped with a main antenna having three radiation patterns, a sum pattern, a difference pattern and a pattern assigned to a control function, corresponding to the said antenna, the said radar furthermore comprising:

an auxiliary antennal device, composed of an antenna and of a rear radiating element situated at the rear of the said antenna, fixed above the said antenna;

and coupling means, the said auxiliary antennal device:

having three radiation patterns, a sum pattern, a difference pattern and a pattern assigned to a control function, the said control pattern being ensured by the said rear radiating element;

being inclined so as to guarantee a maximum gain of its sum pattern in the elevational domain characterizing the said silence cone, for example between 60° and 90°; the said control pattern ensured by the said rear element exhibiting at 90° of elevation a gain equal to that of the sum pattern of the said antenna of the auxiliary antennal device, and then a maximum gain beyond 90° of elevation, the said coupling means ensuring the coupling of the three radiation patterns of the said antenna with the three radiation patterns of the said auxiliary antennal device.

The said antenna of the auxiliary antennal device is for example of open array type.

The position of the sum pattern of the said antenna of the auxiliary antennal device is for example adjusted in elevation and in gain with respect to the pattern of the said main antenna by altering respectively the inclination of the said antenna and the coefficient of coupling between these two antennas.

The steepness of the flanks of the sum pattern of the said antenna of the auxiliary antennal device is for example adjusted by altering the number of elevational elements.

The position of the control pattern ensured by the said rear element is for example adjusted in elevation by altering the inclination of the said rear element in a vertical plane.

The said main antenna is for example composed of an antenna of LVA type, with wide vertical aperture, and of a rear radiating element.

BRIEF DESCRIPTION OF THE DRAWINGS

Other characteristics and advantages of the invention will become apparent with the aid of the description which follows offered in relation to appended drawings which represent.

DETAILED DESCRIPTION

Figure 1B:
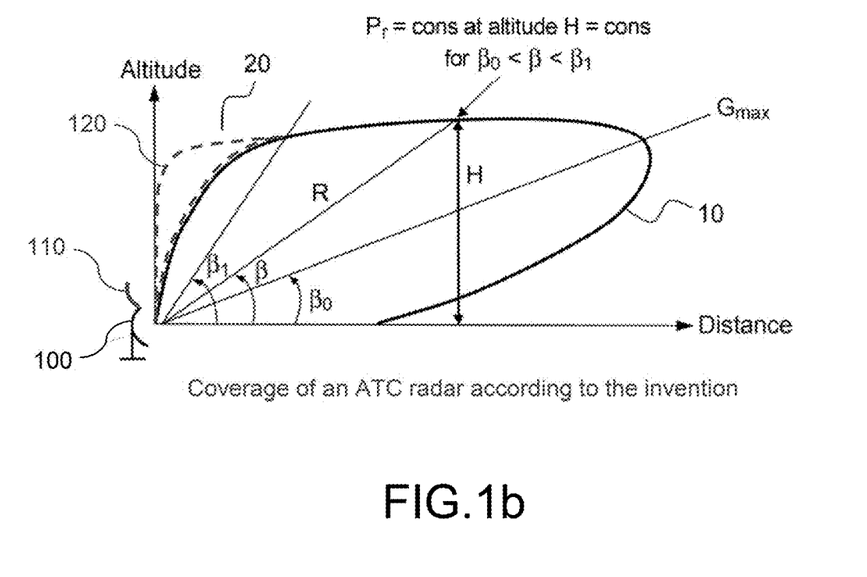
FIG. 1b, already described, an exemplary enhanced ATC radar coverage using gain pattern of the ATC radar antenna according to the invention.
Figure 3:
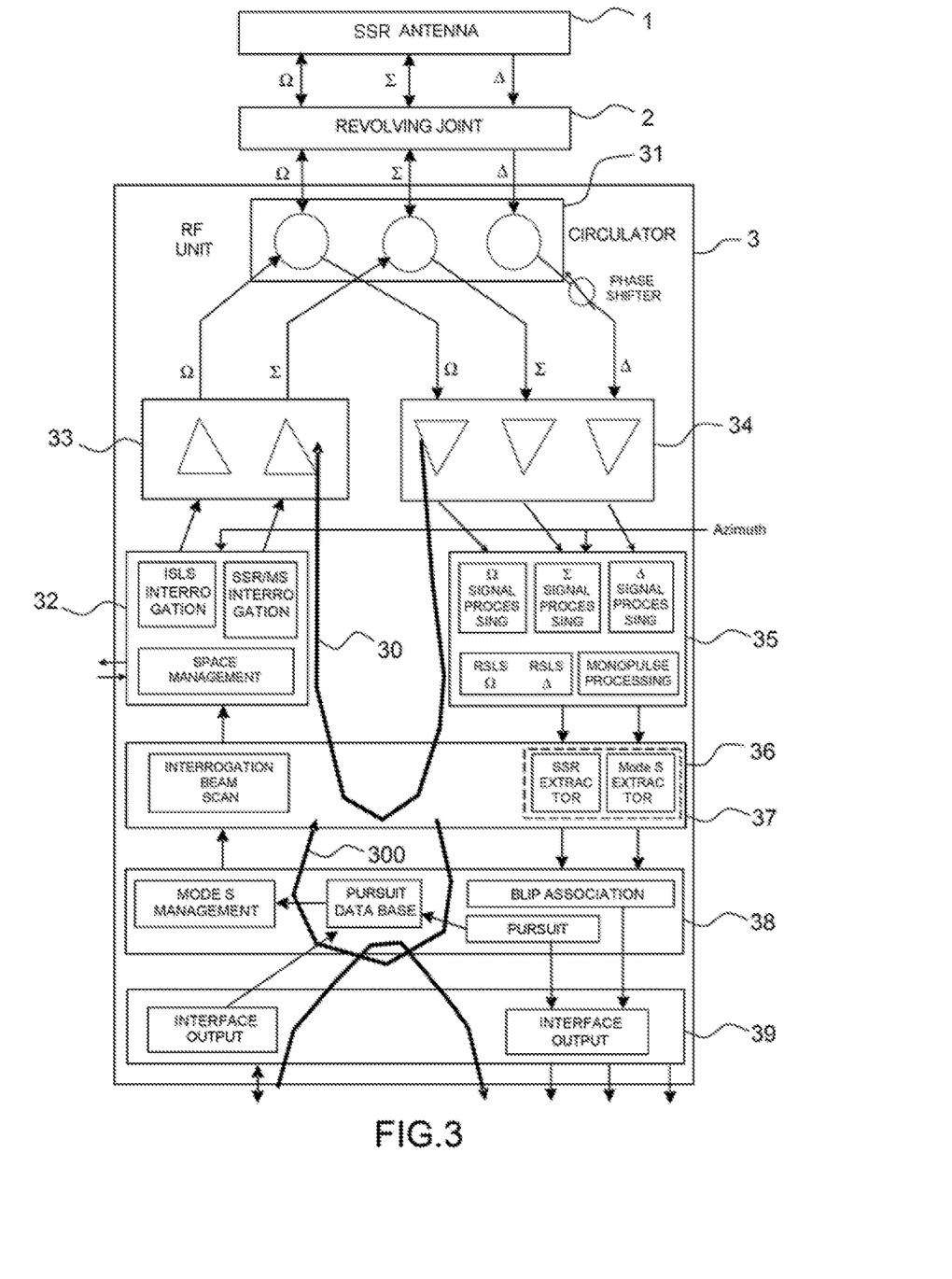
FIG. 3, an exemplary current architecture of a secondary radar operating in S mode.

FIG. 1b shows an exemplary enhanced ATC radar coverage using enhanced gain pattern of the ATC radar according to the invention as it can be obtained using and antenna according to the invention. Such pattern comprises two complementary patterns a conventional pattern 10 obtained using a conventional ATC radar antenna 100 (so called "main antenna") and an additional pattern 120 obtained by using an auxiliary antennal device 110 in combination with said conventional ATC radar Antenna 100, the auxiliary antennal device being configured and arranged relative to the main antenna in such a way that it covers the elevation domain 20 not covered by the main antenna (silence cone), i.e. to cover high elevations, typically extending between 60° and 90°. FIG. 3 presents an exemplary current architecture of a secondary surveillance radar operating in S mode, which radar will subsequently be called an SSR radar, conventionally consisting of:

the SSR antenna 1, generally of LVA type, ensuring the radiation of the SSR/S Mode interrogations, at the frequency of 1 030 MHz and the capture of the responses, at the frequency of 1 090 MHz, arising from the transponders aboard aircraft, a standard revolving joint 2 possessing three RF wafers for the three pathways of the L band of the SSR function: the sum pathway $\Sigma$, the difference pathway $\Delta$ and the control pathway $\Omega$;

a, so-called MSSR, cabinet 3 including in particular two independent systems (just one being represented) ensuring a passive redundancy, each system implementing the various functions dedicated to the SSR/S Mode processing.

The MSSR cabinet 3 comprises an RF unit 31 for transferring the RF signals of the transmitter 33 to the $\Sigma$, $\Delta$, $\Omega$ patterns of the antenna 1 and, reciprocally these patterns to the receiver 34. Each cabinet 3 comprises:

spatio-temporal management 32 engendering the interrogations as a function of the tasks to be performed with the predicted targets present in the main lobe;

a transmitter 33 converting into high-power RF signals the interrogations to be radiated by the antenna, at the frequency of 1 030 MHz;

a receiver 34 demodulating the RF signals, at the frequency of 1 090 MHz, that are received by the antenna;

signal processing 35 ensuring the detection and the decoding of the responses received in the main lobe of the antenna;

an extractor 36 forming blips extracted on the basis of the elementary detections (responses), the extractor being a part of an assembly 37 for managing the antenna beam.

Conventionally, the MSSR cabinet 3 can also include the redundant resources common to the primary and secondary processings, in particular:

the association and the tracking of the primary and secondary blips inside a scan management assembly 38;

the management of the offsets and of the supervision in particular.

The cabinet also comprises the redundant interfaces 39 with the client links. The ancillary functions allow management of the radar by the client by exhibiting the supervision, the blip offsets and tracks and the parametrizations of the primary PSR, secondary SSR/S Mode and offset functions.

In S mode mainly the dynamic management of aircraft is controlled by:

the management of the beam 37, as regards the activities related to the azimuthal beam, which are traversed by an arrowed line 30 in FIG. 3 including in particular the spatiotemporal management 32 and the extraction of the blips 36;

the management of the scan 38 as regards the activities related to the antenna revolution which are traversed by an arrowed line 300 in FIG. 3, including in particular the tracking and the prediction of the activities at the next beam scan for each aircraft.

Figure 4:
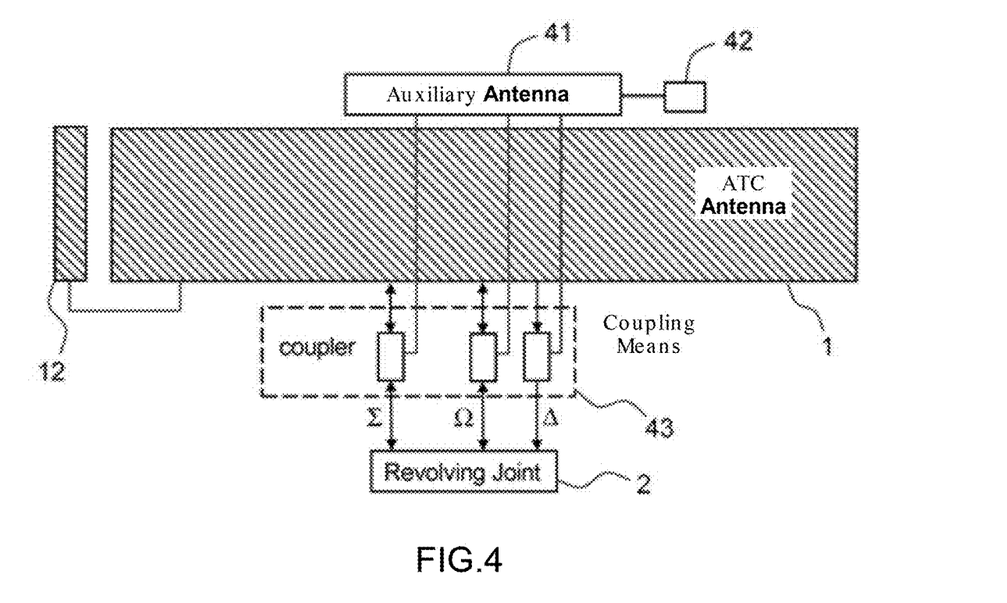
FIG. 4, the structure of the antenna of a radar according to the invention and its coupling to the said radar.

FIG. 4 presents the structure of the antenna of an ATC radar according to the invention and of its coupling to the radar. Advantageously, according to the invention an adaptation kit is added to the existing architecture of an ATC radar, of the type of the architecture presented by FIG. 3 for example, making it possible to ensure the tracking in the silence cone of all the secondary targets whatever the protocol. More particularly this kit is applied to the aerial. It could be supplemented with a software part applied to the means for extracting the blips 36.

The kit comprises at least one open array antenna 41 (comprising few elements, typically from 1 to 3 radiating elements height-wise), which may be of small dimension width-wise, for example 2 to 4 meters, a rear radiating element 42 and coupling means 43. The open array antenna 41 is coupled to the SSR antenna 1 (of standard LVA type) on the same existing access ports by the coupling means 43.

No modification is necessary at the level:
either of the aerial (mechanisms, revolving joint, motor . . . );
or of the transmission and reception chain.

The invention is therefore simple and economical to implement and may be advantageously seen as an upgrade of existing ATC antenna.

Figure 5:
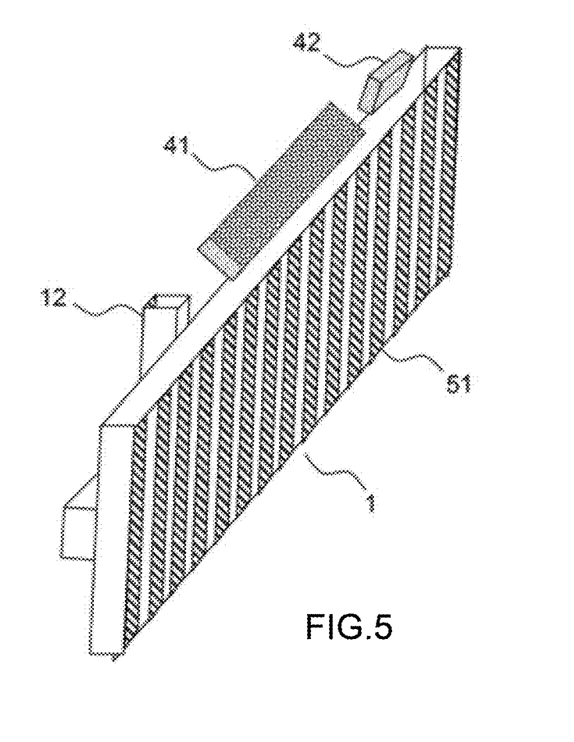
FIG. 5, an exemplary embodiment of antennas making up an antenna of an ATC radar according to the invention.

FIG. 5 presents, as a supplement to FIG. 4, an exemplary embodiment of the antennal assembly of a radar according to the invention, through a perspective view. This assembly is composed:
of the SSR antenna 1 and of its rear radiating element 12, forming the main antenna;
of the open array antenna 41 and its rear radiating element 42, forming the auxiliary antennal device;
the rear radiating elements 12, 42 being assigned to the back part of the control function of the main and auxiliary antenna, respectively, as will be described subsequently.

The open array antenna 41 is fixed above the SSR antenna 1, with the same orientation, more precisely oriented forwards of the SSR antenna 1, it is inclined with respect to that of the SSR antenna 1.

The SSR antenna 1 is conventionally composed of an array of radiating bars 51. This antenna 1, of LVA type, may be a standard antenna of the ATC market for SSR surveillance, operating with three radiation patterns: sum, difference and control.

A radiating element 12, situated at the rear of the frontal panel consisting of the radiating bars, makes it possible to perform a back control function for the SSR mode/S Mode, in particular as regards the geographical situation of the transponders picked up.

The open array antenna 41 is for example an open array antenna often employed as IFF antenna for military radars therefore possessing the same types of radiation pattern as the main antenna 1 of LVA type: sum, difference and control.

Preferably it comprises at least two elevational elements so that the zero gain value is close to its main lobe, by causing a steepening of the flanks on either side of the main lobe as illustrated by the sum pattern 63 of the open array antenna 41 presented in FIG. 6, described subsequently. This steepening of the flanks is dependent on the number of elevational antenna elements.

The antenna 41 is inclined in a vertical plane so as to orient its maximum gain in the silence cone and to guarantee a minimization of its gain both just above 90° of elevation and also below 40°.

Figure 6:
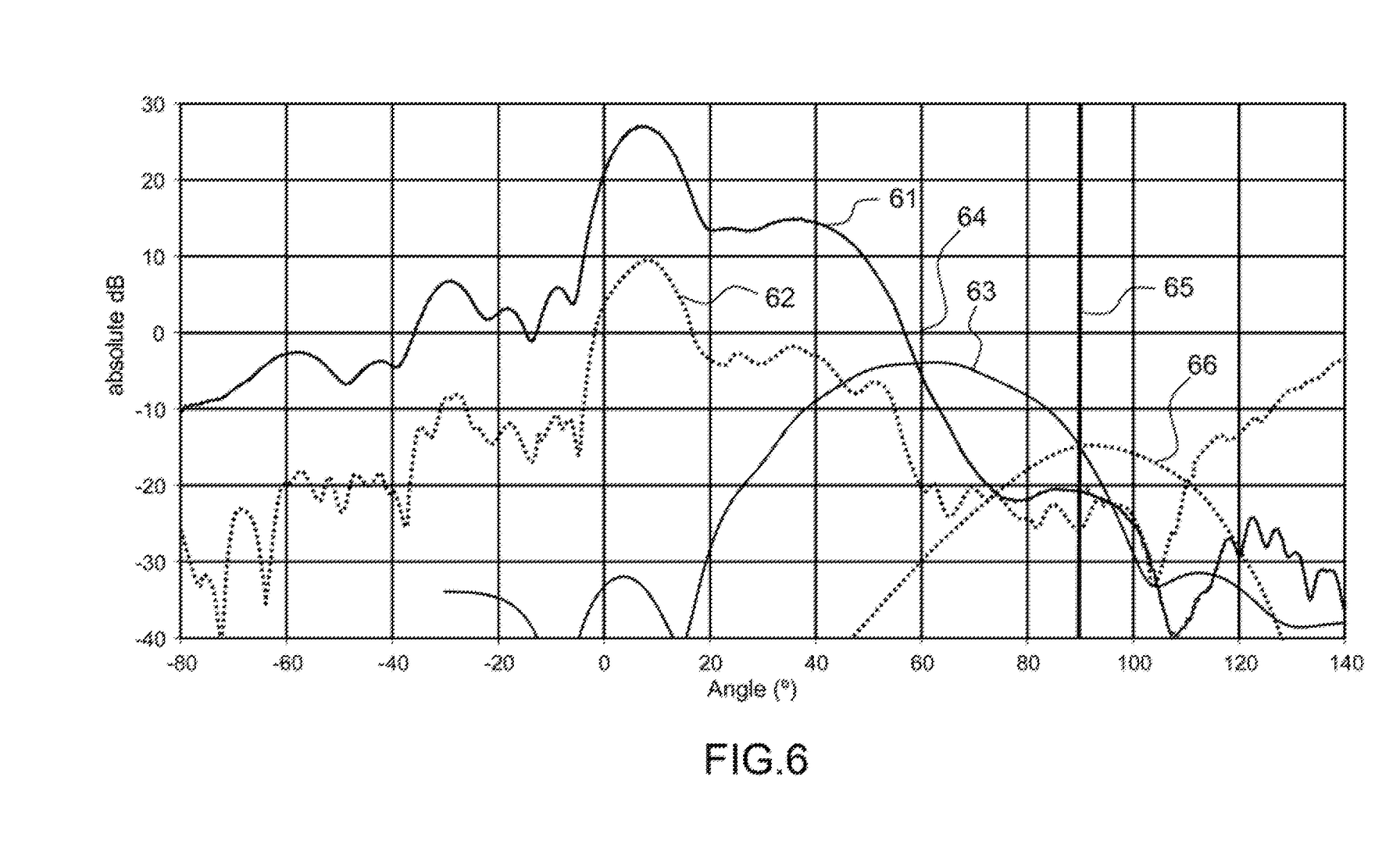
FIG. 6, the typical patterns of absolute radiation in elevation of the antennas making up an antenna according to the invention.

It also comprises a radiating element 42 situated at the rear, dedicated to its control pattern Ω 66 illustrated by FIG. 6, also inclined in elevation, so as to exhibit a maximum gain beyond 90° of elevation. Moreover, the reciprocal inclinations of the open array antenna 41 and of the radiating element 42 are such that their gains are close for 90° of elevation. Thus this makes it possible to block the transponders which are not in the azimuthal direction of the open array antenna 41 and so makes it possible to avoid having parasitic responses in the back of the antenna.

The coupling means 43 carry out the coupling of the three patterns, sum Σ, difference Δ and control Ω, of the open array antenna, with a coupling coefficient typically equal to 25 dB (to be adjusted according to the value of the maximum gain of the pattern 63 of the sum pathway of the open array antenna 41), with the three patterns, sum Σ, difference Δ and control Ω, of the SSR antenna 1, with the aim of guaranteeing a maximum gain of the sum pattern in the silence cone of the order of 20 dB below the sum gain plateau of the SSR antenna (plateau extending from 20° to 40° of elevation as illustrated by FIG. 6).

FIG. 6, already cited, illustrates, in a system of axes where the abscissae represent the angles of elevation and the ordinates the absolute antenna gains, the elevational radiation patterns of the antennas described hereinabove for the sum pathway 61 of the SSR antenna 1, for the control pathway 62 of the SSR antenna 1, for the sum pathway 63 of the open array antenna 41, and for the control pathway 66 of the rear radiating element 42 of the auxiliary antennal device.

As shown by these patterns, an objective is to ensure a minimum gain of the order of 35 to 40 dB below the maximum even at 90° of elevation (aircraft at high elevation necessarily being close together distance-wise, the antenna gain required for their detection is markedly smaller than that for long-range aircraft, typically 35 to 40 dB). This objective is obtained by inclining the open array antenna 41, the effect of this being to translate its elevational patterns, and in particular its sum pattern (translation along the abscissa axis). The value of the coefficient of coupling between the open array antenna 41 and the SSR antenna 1, by altering the gain, makes it possible moreover to adjust the patterns along the ordinate axis. The adjusting of the position of the patterns is thus supplemented by a translation along the ordinate axis.

The value of the coupling coefficient is thus defined, both:
to avoid pollution of the SSR antenna 1 by the open array antenna 41, i.e. for example more than 25 dB of gain disparity below 40° of elevation:
with very low induced losses transmission-wise and detection-wise;
and almost no beam modification azimuth-wise;
to avoid polluting by "garbling" the close targets at lower elevation below 40° (typical of an airport radar) when detecting targets at high elevation.

The zone 64 of gain equivalence of the sum pathways between the SSR antenna 1 and the open array antenna 41 is typically situated around 55° of elevation. Beyond this value of elevation, the gain 63 of the open array antenna takes over from the gain 61 of the SSR antenna 1 to ensure the desired minimum gain for the sum pathway up to the zenith. It may be verified that the level transmitted on the pattern of the sum pathway 63 of the open array antenna 41 is much greater than the level of the pattern of the control pathway 62 of the SSR antenna 1 guaranteeing that targets at high elevation from 60° to 90° typically respond to the interrogations of the radar. The control pathway 62 associated with the rear element 12 of the SSR antenna 1 conventionally allows the blocking of the transponders receiving interrogations through the leaks of the sum radiation pattern 61 of the antenna for elevations of 90° to 180°.

Preferably the sum radiation pattern 63 of the open array antenna must not be too wide so as not to disturb the radiation pattern 61 of the main antenna outside of the silence cone. The control pathway 66 associated with the radiating element 42, situated at the rear of the open array antenna 41, makes it possible to avoid receiving target responses beyond the elevation at 90°, flagged by vertical line 65 in FIG. 6. The adjustment of the position elevation-wise of the control pattern 66 with respect to the control pattern 62 of the SSR antenna 1 is made by translation along the abscissa axis (elevation angle axis), by altering the inclination of the rear radiating element 42.

The signals transmitted by the radar via the rear element 42 thus allow the blocking of the transponder of a target when the main antenna 1 (and therefore also auxiliary antenna 41) is in the direction opposite to the azimuth of this target. The radiation pattern and the orientation of this radiating element 42 are adapted for this purpose, in particular an optimal setting ought to make it possible to block the transponder onwards of 91°.

Around the zone 64 of equivalence of the gains of the sum pathways of the SSR antenna 1 and of the open array antenna 41, the phase-wise uncontrolled recombining of the signals may induce detection losses over a span of the order of +/−5°, i.e. from +50° to +60°, elevation-wise in the example of this FIG. 6. To limit these induced effects, it may be useful to ensure the phasing of the signals transmitted at 1 030 MHz by the two sum patterns 61 and 63.

Figure 7:
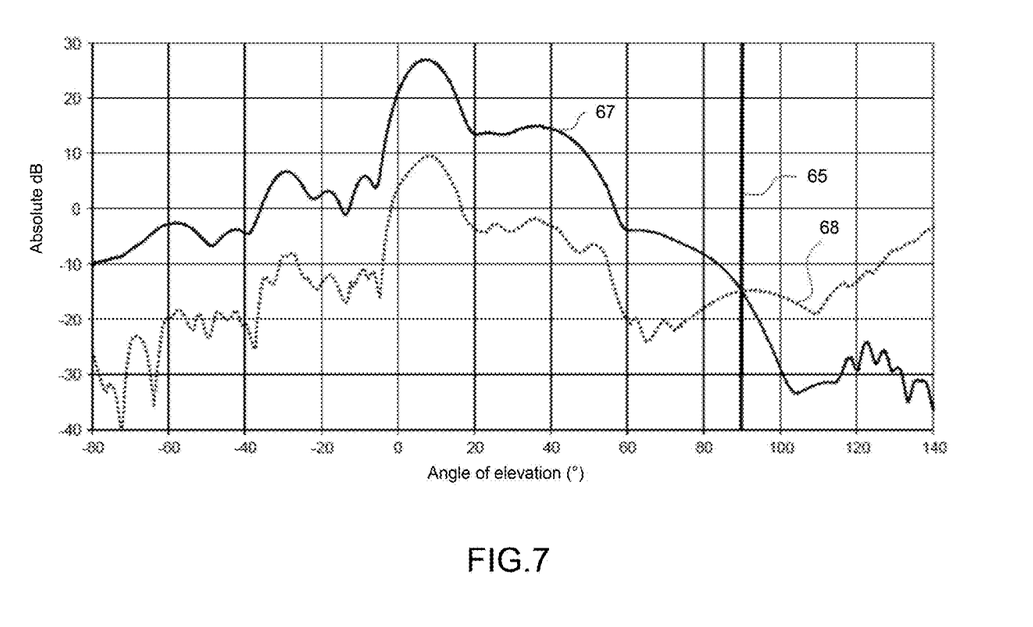
FIG. 7, the typical resulting sum and cont patterns of absolute radiation in elevation obtained with an antenna of an ATC radar according to the invention.

FIG. 7, illustrates, in a system of axes where the abscissae represent the angles of elevation and the ordinates the absolute antenna gains, the elevational radiation patterns for sum pathway 67 and the control pathway 68, advantageously resulting from the combined operation of the main antenna 100 and auxiliary antenna device 110 described hereinabove.

As it can be noticed, the resulting SUM pattern 67 exhibits an enhanced gain for elevations between 60° and 90° with respect to the gain of the main Antenna operated alone. Besides, the resulting control pattern 68 exhibits, for elevations above 90° a gain which is greater than that of the resulting SUM pattern 67, which makes it possible to avoid receiving target responses beyond the elevation at 90° (reception from the rear of the antenna).

The invention claimed is:

1. A secondary radar able to detect a target at high elevation in a silence cone, equipped with:
    a main passive antenna having three radiation patterns and built in two parts:
        a main antenna panel oriented forwards, providing a sum pattern, a difference pattern and a control front pattern part of a control function;
        a rear radiating element oriented backwards, ensuring a control back pattern part of a control function;
    a passive auxiliary antennal device fixed above the main antenna and having also three radiation patterns directed in an elevational domain characterizing the silence cone, said auxiliary antennal device being built in two parts:
        an antenna panel providing a sum pattern, a difference pattern, and a control front pattern, part of a control function, oriented forwards of the main antenna panel, said antenna panel being inclined to guarantee a minimum gain of its sum pattern up to 90° elevation to detect aircraft,
        a rear radiating element providing a control back pattern, part of said control function, oriented backwards of the main antenna panel, said radiating element being inclined such that the back control pattern exhibits, for an elevation equal to or greater than 90°, a gain equal to or greater than that of the sum pattern of the antenna panel of the auxiliary antennal device;
    coupling means ensuring the coupling of the three radiation patterns of the main antenna with the three radiation patterns of the auxiliary antennal device to get a resulting sum pattern, a resulting difference pattern, and a resulting control pattern.

2. The secondary radar according to claim 1, wherein the antenna of the auxiliary antennal device is of open array type.

3. The secondary radar according to claim 1, wherein the sum pattern of the antenna of the auxiliary antennal device with respect to the sum pattern of the main antenna is adjusted in elevation by altering the inclination, in a vertical plane, of the front antenna of the auxiliary antennal device.

4. The secondary radar according to claim 1, wherein the front antenna of the auxiliary antennal device comprises at least two elevational elements.

5. The secondary radar according to claim 1, wherein the position of the control pattern ensured by the rear element is adjusted in elevation by altering the inclination of the rear element in a vertical plane.

6. The secondary radar according to claim 1, wherein the main antenna is of large vertical aperture (LVA) type.

7. The secondary radar according to claim 1, wherein the sum pattern of the antenna of the auxiliary antennal device is adjusted in gain with respect to the sum pattern of the main antenna by altering the coefficient of coupling between the two antennas for the three patterns sum, difference, and control front.

* * * * *